Figure 1:
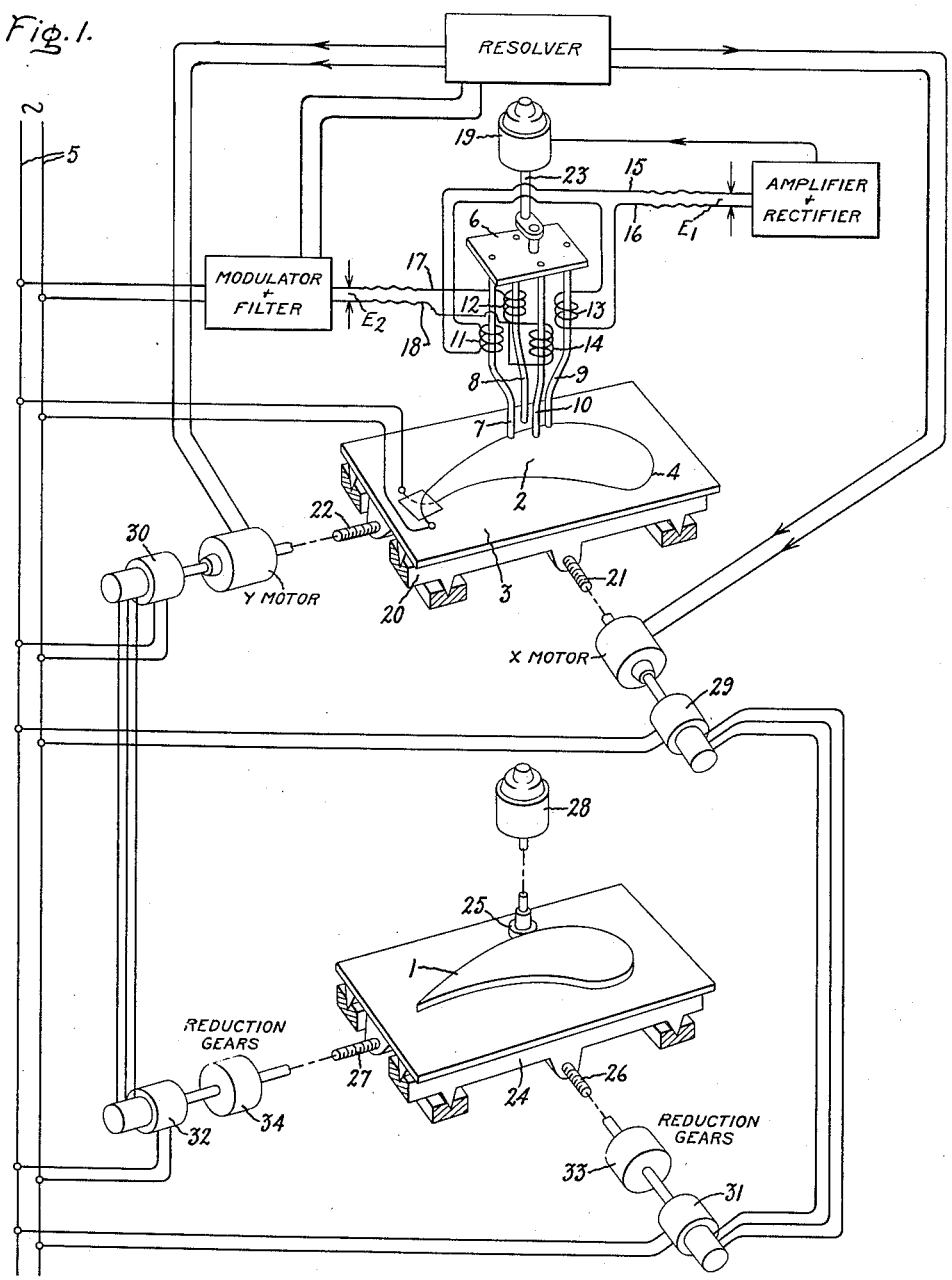

May 25, 1954

T. M. BERRY 2,679,620

LINE FOLLOWER

Filed April 30, 1952

Inventor:
Theodore M. Berry,
by Paul A. Frank
His Attorney.

Patented May 25, 1954

2,679,620

UNITED STATES PATENT OFFICE 2,679,620

LINE FOLLOWER

Theodore M. Berry, Schenectady, N. Y., assignor to General Electric Company, a corporation of New York Application April 30, 1952, Serial No. 285,346

7 Claims. (Cl. 318—19)

The present invention relates to line follower control systems, and more particularly to a control system in which a current carrying line of varying curvature is followed by an electromagnetic tracking device.

It has as an object the provision of a simple, reliable and automatic control system of this type.

Another object of the invention is to provide improved electromagnetic means to control the tracking device so that it will follow automatically any given curve in the reference line.

A further object of the invention is to provide a line follower system utilizing an electrical conductor as the reference line and the electromagnetic flux around the conductor to provide the error signals for control of the tracking device.

In carrying out my invention in one form, I provide a drawing in which a reference line thereon is formed of or coated with an electrically conductive material such as silver paint or the like. Supported above the drawing is an electromagnetic device having a plurality of downwardly extending legs, preferably four in number, around each of which is wound an electric conductor. The legs may depend, for example, from the corners of a rectangular base or from the peripheral edge of a circular base. The coils on oppositely spaced legs are connected together and their free ends are brought out to a point remote from the electromagnetic head. One pair of legs is arranged to be aligned with the path of the line to be followed, and, upon movement of the head along the line, the windings for these legs will have a zero net induced voltage across their free ends so long as this alignment is maintained. In case of misalignment, however, the electromagnetic flux surrounding the current-carrying line will induce a voltage of opposite phase in the two coils, producing a net voltage across the coil ends. The phase will be dependent on the direction the head is turned relative to the path of the current carrying line.

The legs of the other pair are arranged to be equally spaced on opposite sides of the current-carrying line, in which position the voltage induced in their associated coils is equal and of the same phase, the coils being oppositely wound, thus producing a zero net voltage. When the scanning head is not centered on the line, however, the voltage induced in these coils will be unequal, thereby producing a net voltage across the free ends.

Driving means are provided to rotate the magnetic head in response to the induced voltage caused by misalignment of the head, thereby to realign it along the current carrying line. Additional driving means, responsive to the induced voltage caused by displacement of the head to one side or the other of the current-carrying line are provided to effect corrective movement perpendicular to the line. Thus, by proper integration of the error signals and the driving means responsive thereto, the magnetic head will be kept properly aligned relative to the current-carrying line and will be moved along the line with its outer magnetic legs equally spaced therefrom.

In illustrating a use of the invention in one form, it is shown operating a cutting tool which may, for example, be a milling cutter. As the line follower moves along the reference line, its position is transmitted electrically through power selsyns to a machine which cuts out the same shape from a metal or other blank.

Figure 2:
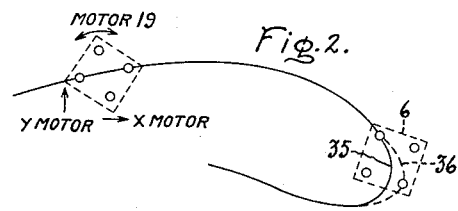

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a simple schematic illustration of my invention in block diagram form and Fig. 2 is a sketch in diagram form illustrating the path of the pickup head in following a curved line.

Referring now to the drawing, my invention is illustrated in a selsyn system in which a workpiece 1 is being cut to conform to a shape 2, defined on a drawing 3 by a line 4 of electrically conductive material. Suitable power means, such as the alternating current source 5, are provided to cause a current to flow in the conductive line 4. I utilize the magnetic field created by this current flow to control a suitable electromagnetic pick-up head 6 and cause it to track along the line. The pick-up 6 preferably does not make contact with the line, but nevertheless follows the path of the current. In case it is desirable to use several lines on a single sheet of drawing, crossed or closely-adjacent lines can be insulated from each other, and my pick-up head used to follow the line through which the electric current is passing.

My presently preferred magnetic pick-up head 6 is provided with four depending poles 7, 8, 9 and 10, respectively provided with electrically-conductive coils 11, 12, 13 and 14. Coils 11 and 13 are similarly wound and connected together, and coils 12 and 14 are oppositely wound and connected together. Poles 7 and 9 are arranged to be aligned relative to the current-carrying lines so that the line passes under the lower edge of each leg. Poles 8 and 10, however, are spaced from the current-carrying line on opposite sides thereof. Free ends 15 and 16 of coils 11 and 13 are led away from the head so that the induced voltage $E_1$ between these two conductors can be amplified and used to operate means for re-aligning the head 6 relative to the current carrying line. Free ends 17 and 18 of coils 12 and 14 are also led away from the pick-up head, and the induced voltage $E_2$ between them is used to operate control means for centering the head with respect to the line so that poles 8 and 10 are equally spaced therefrom.

When the magnetic head is moved along the line in a manner explained hereinafter, the voltage $E_1$ is zero while the head is properly aligned with and centered with respect to the line. Any voltage in coils 11 and 13 is equal and in phase, so that no net voltage results. When, however, the head is rotated out of alignment with the reference line, or the line curves out of alignment with the head, a voltage of opposite phase will be induced in coils 11 and 13 as these two similarly wound coils will be cutting across flux lines on opposite sides of the reference line. Consequently, a net voltage $E_1$ will be produced, the phase of which will be determined by the direction of rotation of the head from its proper heading.

Similarly, when the head becomes positioned off-center laterally from the path of the reference line, the coils 12 and 14 will be moving across flux fields of different intensities. Consequently, the induced voltage in the coils will be of different values. Although the phase is the same since the poles are on opposite sides of the line and the coils are oppositely wound, a net voltage $E_2$ will be produced, equal to the difference in the induced voltage in coils 12 and 14 and varying in a known relation to the lateral displacement of the head from a central position straddling the line.

The illustrated system controlled by the voltages, or error signals, $E_1$ and $E_2$, includes a pair of reversible motors X and Y operated in response to the $E_2$ signal and a reversible motor 19 operated in response to the $E_1$ signal. The drawing 3 is supported on a movable supporting table 20 which is driven or fed under the pick-up or scanning head 6 by a pair of lead screws 21 and 22 operated by the X and Y motors, respectively. It should be understood, however, that the table may be held stationary and the tracting head be driven, or that any suitable combination of driving of both may be successfully employed.

The reference line may be connected to a suitable source of high frequency alternating current (not shown), or it may be connected directly to a standard 60 cycle power line, as shown in Fig. 1. Preferably, the system is operated from 60 cycle rather than high frequency current because of the great advantage resulting from inherently less radiation. If high frequency operation is desired, it becomes necessary to employ a modulator and filter to which both 60 cycle power and the high frequency $E_2$ error signal are supplied. The modulator acts to modify the 60 cycle voltage with the amplitude of the high frequency error signal, and provides a 60 cycle signal of varying amplitude to resolver. If the reference line is being operated from a 60 cycle voltage source (as shown), the modulator employed modifies the 60 cycle supply voltage in accordance with the amplitude of the 60 cycle error voltage, and again delivers a 60 cycle varying amplitude signal to the resolver. Thus, it is seen that the $E_2$ error signal is used to control an external source of power rather than to provide power itself. The resolver, which should be kept properly aligned with the scanning head, divides the modulated 60 cycle signal supplied to it from the modulator into X and Y components for controlling the speed and direction of rotation of the X and Y motors, respectively.

The direction of rotation of the X and Y motors depends on the phase of the voltage $E_2$, which in turn depends upon which of the coils 12 and 14 are cutting across the magnetic field portion of greater intensity.

The angular alignment or heading of the tracking device 6 must be corrected when an error develops, as indicated by a signal voltage $E_1$. Through a shaft 23 the motor 19 operates to rotate the head 6 in response to the error signal $E_1$, to correct any angular misalignment. This error signal is suitably amplified and rectified as indicated in Fig. 1, and controls the direction of rotation of motor 19 according to the phase of the induced voltage. Maintaining proper angular alignment in the manner described is important if the error signal $E_2$ is to give a correct indication of the lateral misalignment.

As mentioned above, my invention is shown with a selsyn system for controlling the cutting of the work-piece 1 to conform to the shape 2.

The work-piece 1 is mounted on a work-table 24, and a cutting member 25 is suitably supported above it by means not shown. The cutter must be free to move relative to the work-piece 1; and transverse motion is imparted to the latter by means of lead-screws 26 and 27. It will be understood, however, that the table may be held stationary and the longitudinal and transverse motions may be imparted to the cutting assembly with equally satisfactory results.

The shaft of the cutter 25 is driven by suitable drive means illustrated in the drawing as an electric motor 28; and the lead-screws 26 and 27 are driven through a suitable motion transmitting system illustrated as a power selsyn system comprising selsyn transmitters 29 and 30, driven by the X and Y motors, and selsyn receivers 31 and 32 which are electrically connected to the transmitters. Suitable reduction gearing assemblies 33 and 34 may be respectively interposed between the receivers 31 and 32 and the screws 26 and 27.

The selsyn transmitting system by which my magnetic line follower controls the cutting of the work-piece, and the signal receiving system are not described in detail as they are not a part of my present invention and may be of the type shown and described in Patent 2,499,178, dated February 28, 1950, issued jointly to Howard L. Clark and the present applicant, and assigned to the General Electric Company, assignee of the present application.

Referring now to Fig. 2, the path of the scanning head 6 is illustrated as it follows the conducting line 4. As the head travels along the line as a result of the movement of the table 20 by the screws 21 and 22, it is initially assumed that no errors exist. Consequently the X and Y motors are operated entirely by the independent voltage source as there is no error signal voltage. As the head reaches the curved portion 35, however, errors will immediately develop, as exaggeratedly shown by the dotted line path 36 of the head. While the head actually may follow a path nearer the curved portion 35, some deviation, such as illustrated by the line 36, will result. Consequently, both the angular and lateral misalignment signals $E_1$ and $E_2$ will begin to control the head aligning system just described, including motor 19 and the X and Y motors. The motor 19 will turn the head in a clockwise direction to align it with the changed direction of the conducting line and the X and Y motors will move the head perpendicularly to the line so that the poles 8 and 10 will again be equally spaced on either side of it. After the pick-up head has been returned to its correct position relative to the line 4, and in correct angular alignment with the path of current flow, voltages $E_1$ and $E_2$ will return to zero, de-energizing the motor 19 and permitting the independent energizing source for the motors X and Y to regain control.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a line following system, an electrically conductive reference line for connection to a source of low frequency alternating current to provide a magnetic field about said line, a magnetic scanning head, means for moving said scanning head along said line, electromagnetic means associated with said scanning head for providing an induced voltage upon lateral displacement of said head relative to said line, and means responsive to the phase and magnitude of said voltage to return said scanning head to a predetermined position relative to said line during movement along the path of said line.

2. In a line following system, an electrically conductive reference line for connection to a source of alternating current to provide a magnetic field about said line, a magnetic scanning head, means for moving said scanning head along said line, electromagnetic means associated with said scanning head for providing an induced voltage upon angular misalignment of said head relative to said line, and means responsive to the phase and magnitude of said induced voltage to rotate said scanning head to realign it with said reference line during movement of said head along said line.

3. In a line following system, an electrically conductive reference line, a source of current for said line to provide a magnetic field about said line, a magnetic scanning head, means for moving said scanning head along said line, electromagnetic means associated with said scanning head for producing induced voltages upon improper alignment and positioning of said head relative to said line, and means responsive to the phase and magnitude of said voltages to move said scanning head transversely and angularly to maintain its alignment and position relative to said line during movement of said head along said line.

4. In a line tracking apparatus, a magnetic pickup device for following an alternating current carrying reference line, said pick-up device comprising two pairs of poles of magnetic material, each of said poles having wound thereon an electrically conductive coil, means for moving said device across the magnetic field of a current carrying reference line, and motor means responsive to both the phase and magnitude of the net induced voltage across the coils of each of said pairs of poles to maintain the position and heading of said head relative to said line during tracking.

5. In a line tracking apparatus, the combination of an electromagnetic following head comprising a pair of poles of magnetically permeable material constructed to straddle an alternating current carrying reference line, a coil surrounding each of said poles, one end of each coil being connected together, means for moving said following head in a predetermined direction relative to its angular position, and positioning means connected across the free ends of said coils and responsive to the phase and magnitude of a voltage therebetween to align said following head relative to said line, said coils being so wound that when said poles are on opposite sides of said reference line opposing voltages are induced across said coils by a magnetic field surrounding said reference line, the net induced voltage across both of said coils being dependent in phase and magnitude upon the difference in flux density of the portions of said magnetic field in which the respective poles are positioned.

6. In a line tracking apparatus, the combination of an electromagnetic following head comprising a pair of members of permeable magnetic material constructed to follow an alternating current carrying reference line, a coil of conductive material wound around each of said members, one end of each coil being connected together, said coils being so wound that when said members are on opposite sides of said reference line re-enforcing voltages are induced across said coils by a magnetic field surrounding said reference line, means for moving said following head in a predetermined direction relative to its angular position, and positioning means connected across the free ends of said coils and responsive to the magnitude and phase of a net voltage induced across said coils to control the angular position of said following head, the phase of said net induced voltage being dependent on the direction of angular misalignment of said head with respect to said reference line.

7. In a line tracking apparatus, the combination of an electromagnetic following head comprising a first pair of poles of magnetic material constructed to straddle an alternating current carrying reference line, a second pair of poles of magnetic material constructed to follow said reference line, a coil surrounding each of said poles, one end of each coil surrounding a pole of said first pair being connected together and one end of each coil surrounding a pole of said second pair being connected together, the coils surrounding the poles of said first pair being so wound that when the poles of said first pair are on opposite sides of said reference line opposing voltages are induced across said coils by a magnetic field surrounding said reference line, the coils surrounding the poles of said second pair being so wound that when the poles of said second pair are on opposite sides of said reference line re-enforcing voltages are induced across said coils by said magnetic field, means for moving said following head along said reference line, first positioning means connected across the free ends of the coils surrounding the poles of said first pair and responsive to the phase and magnitude of a net voltage induced therein to align said following head relative to said reference line, and second positioning means connected across the free ends of the coils surrounding the poles of said second pair and responsive to the phase and magnitude of the net voltage induced therein to control the angular position of said following head.

References Cited in the file of this patent

UNITED STATES PATENTS

| Number | Name | Date |
|---|---|---|
| 2,354,391 | McCourt | July 25, 1944 |
| 2,499,178 | Berry | Feb. 28, 1950 |
| 2,590,091 | Devol | Mar. 25, 1952 |
| 2,611,115 | Johnston | Sept. 16, 1952 |